United States Patent [19]

Fukagawa

[11] 4,009,288
[45] Feb. 22, 1977

[54] METHOD OF PREPARING INSTANT WONTONS CONTAINING A FILLER

[75] Inventor: Kiyoshi Fukagawa, Hino, Japan

[73] Assignee: Toyo Suisan Kaisha Ltd., Tokyo, Japan

[22] Filed: Apr. 6, 1976

[21] Appl. No.: 674,180

[52] U.S. Cl. .................................. 426/297; 426/94; 426/549

[51] Int. Cl.² .......................................... A21D 13/00

[58] Field of Search .......... 426/549, 297, 275, 283, 426/94, 439, 496

[56] References Cited

OTHER PUBLICATIONS

Chu "The Pleasures of Chinese Cooking" Cornerstone Library, N.Y. 1974 pp. 50, 51, 157–159.

Claiborne et al. "The Chinese Cookbook" J. B. Lippincott Company, N.Y. 1972 pp. 370–373.

*Primary Examiner*—Raymond N. Jones
*Attorney, Agent, or Firm*—Carroll F. Palmer

[57] ABSTRACT

Preparation of instant wontons containing a filler by preliminarily frying raw wontons formed of a filler wrapped in a skin containing 28 to 33% by weight of water in oil heated to 105° to 120° C to reduce the water content of the skin to 16 to 20% and then finally frying the preliminarily fried wontons in oil heated to 125° to 140° C to decrease the water content of the skin to 4 to 8%.

7 Claims, No Drawings

METHOD OF PREPARING INSTANT WONTONS CONTAINING A FILLER

DESCRIPTION OF THE INVENTION

This invention relates to a method of preparing instant wontons containing a filler. The term "wontons containing a filler", as used herein, is defined to mean a particular kind of Chinese food prepared by wrapping a filler such as minced meats and vegetables in a skin of dough mainly formed of, for example, wheat four. Generally, the wontons are boiled in a suitable hot soup and served floating in said soup. For convenience of description, the above-mentioned wontons containing a filler are herein-after sometimes simply referred to as "wontons".

Wontons customarily prepared contain about 30% by weight of water and become too readily perishable to be marketed as preservable food.

In recent years, instant foods have come to be widely accepted. Thus, strong demand is now made for preparation of instant wontons.

At present, the instant food industry makes it a rule to prepare instant foods with as low a water content as 4 to 8% for the object of rendering them preservable and also ready to be served in an edible state. Therefore, wontons would be dried to reduce the water content thereof to the above-specified level in order to market them as a kind of instant food. Frying can be considered to be the easiest and least expensive process of drying raw wet wontons. However, oil drying of raw wontons without defiling their appearance and loosing their incentive to excite consumers' appetite makes it necessary to use oil heated to a relatively low level of temperature. This process consumes a great deal of time and considerably obstructs the quantity production of instant wontons. Conversely where wontons are dried by being fried in highly heated oil, then puffs or bubbles take place on the surface of an instant wonton skin which is consequently roughened to hinder the smooth touch feeling of the consumers's tongue. The above-mentioned undesirable event occurring on the surface of the skin of a fried wontons very much decreases its commercial value when marketed as instant food. The aforesaid circumstances have hitherto prevented instant wontons containing a filler from being quickly produced in quantities.

It is accordingly the object of this invention to provide a method of preparing quickly and in quantities instant wontons having a favorable appearance and good texture of mouth-feeling when consumed.

To this end, the method of this invention comprises a first step of frying raw wontons containing a filler in oil heated to a relatively low level of temperature and a second step of further frying the preliminarily fried raw wontons in oil heated to a higher level of temperature than used in the first step.

The object and features of this invention will be more fully understood by reference to the following description.

First, raw wontons containing a filler are prepared. The wonton is formed, as is well known, of a bag-shaped skin and a filler wrapped therein. The skin mainly consists of wheat flour mixed with water, and, where necessary, further includes additives such as table salt, so-called "Kanpun" and sorbitol. The Kanpun is a granular additive customarily used in preparing Chinese food and mainly consists of powders of potassium carbonate and sodium carbonate and, if required, further includes a small amount of another form of carbonate or phosphate. A wonton skin containing 28 to 33% by weight of water is considered most suitable from the standpoint of mechanical workability. The instant wonton-preparing method of this invention also uses a dough skin whose water content lies within the above-mentioned range. The filler is prepared from minced meat of, for example, pork, chicken or beef mixed with minced vegetable of, for example, onion, garlic, mushroom or potato. The filler is suitably seasoned as occasion needs and normally dried to a lower water content than 15% by weight.

Raw wontons are prepared by a known apparatus such as that set forth in the U.S. Pat. No. 3,858,497. The present inventor conducted the following experiments in which raw wontons were fried under different conditions. In the experiments, the known kinds of fryer and palm oil were used, and twenty samples of raw wonton each formed of a skin containing 31% by by weight of water and a filler containing less than 15% by weight of water were put in each fryer. Throughout the experiments, data represent the average of values obtained from every 20 wonton samples fried in the respective fryers.

EXPERIMENT 1

The present inventor fried twenty samples of raw wonton in oil heated to different levels of temperature, and examined relationships between physical changes in the skin surface of said samples thus fried and the various levels of temperature to which oil was heated. The samples of raw wonton were fried 1 minute in oil heated to different levels of temperature lying within the range of 105° to 140° C. In this Experiment 1, examination was made of the water content of the skin of each sample of fried raw wonton and the number of puffs and roughened condition appearing on the skin surface. From the standpoint of the commercial value of the wonton, measurement was made of puffs having a diameter of 3 mm and over. The results of experiment are set forth in Table 1 below.

Table 1

| Oil temperature (° C) | Time of frying (second) | Water content after frying (% by weight) | Number of puffs per fried wonton | Condition of the skin surface of the fried wonton |
| --- | --- | --- | --- | --- |
| 105 | 60 | 25.0 | None | Smooth |
| 110 | 60 | 18.5 | None | Smooth |
| 115 | 60 | 14.0 | 1 | Smooth |
| 120 | 60 | 12.6 | 2 | Slightly roughened |
| 125 | 60 | 9.0 | 3 | Slightly roughened |
| 130 | 60 | 6.6 | 5 | Slightly roughened |
| 135 | 60 | 6.3 | 6 | Slightly roughened |
| 140 | 60 | 5.4 | 8 | Noticeably roughened |

In view of market demand, a fried wonton presenting three or more puffs on the skin surface may be regarded as losing its commercial value. Though no experiment was carried out, water contained in the raw wonton is physically supposed to be little evaporated when the raw wonton is fried in oil heated to 100° C or a lower level of temperature. As apparent from Table 1 above, oil should be heated to temperature ranging between 105° and 120° C.

The roughening of the skin surface of the fried raw wonton is supposed to result from the uneven local evaporation of water from said skin surface. The event has been found to become more prominent as the frying oil is heated to higher temperature. Since the wonton is desired to have a smooth skin surface, the frying oil is preferably heated to lower temperature than 115° C, at which the skin surface does not present any roughened condition. Further it is preferred to heat the frying oil to higher temperature than 110° C in order to shorten the frying time of the raw wonton.

It has been concluded from the above-mentioned data of Experiment 1 that the temperature of frying oil should be chosen to lie between 105° and 120° C, or more preferably between 110° and 115° C.

EXPERIMENT 2

Samples of raw wonton were fried in oil heated to various levels of temperature, until the water content of the skin of the raw wonton was reduced to 4 to 8% considered effective to render the raw wonton suitable to be preserved as instant food. Examination was made of the relationships of the oil temperature, frying time and skin surface condition of each sample of fried raw wonton, the results being set forth in Table 2 below.

Table 2

| Oil temperature (° C) | Frying time (second) | Water content after frying (% by weight) | Number of puffs per fried wonton | Condition of the skin surface of the fried wonton |
|---|---|---|---|---|
| 105 | 600 | 7.5 | None | Smooth |
| 110 | 420 | 5.7 | None | Smooth |
| 115 | 300 | 6.8 | 1 | Smooth |
| 120 | 180 | 6.0 | 2 | Slightly roughened |
| 125 | 150 | 6.1 | 3 | Slightly roughened |
| 130 | 75 | 5.2 | 5 | Noticeably roughened |
| 135 | 60 | 6.3 | 6 | Noticeably roughened |
| 140 | 60 | 5.4 | 8 | Noticeably roughened |

As seen from Table 2 above, the number of puffs appearing on the skin surface of the fried raw wonton and the condition of said skin surface were more predominantly governed by the temperature of frying oil rather than the frying time. Where, therefore, only the commercial value of the instant wonton is taken into account, it has been ascertained as in Experiment 1 that the temperature of frying oil should be chosen to range from 105° to 120° C, or preferably from 110° to 115° C. Where, however, the wonton was fried in oil heated to temperature falling within the first mentioned range, it was found that frying had to be continued 180 to 600 seconds.

EXPERIMENT 3

Samples of raw wonton were fried in oil heated to 110° C with the frying time alone varied. Determination was made of the relationships between the different frying lengths of time and decreases in the water content of the skin of each sample of raw wonton thus fried.

Table 3

| Frying time (minute) | Water content of the skin of fried wonton (% by weight) |
|---|---|
| 0 | 31.0 |
| 1 | 18.5 |
| 2 | 16.0 |
| 3 | 11.7 |
| 4 | 9.8 |
| 5 | 7.5 |
| 7 | 5.0 |

Table 3 shows that water contained in the skin of the fried wonton was evaporated relatively fast during the first one minute of frying and slowly later.

The lower the water conent of the skin, the more preferred the resultant fried raw wonton, when its preservable property alone is taken into amount. Where, however, the readiness of a fried raw wonton to be served in an edible state and also its flavor are considered, the skin should contain 4 to 8% by weight of water.

As apparent from Experiments 1 to 3, the raw wonton should be fried 180 to 600 seconds in oil heated to a temperature ranging from 105° to 120° C or more preferably from 110° to 115° C in order to reduce the water content of the skin of the fried raw wonton without losing its commercial value. This conclusion has been proved to apply to other kinds of raw wonton whose skin contains not only 31% by weight of water but also other amounts of water falling within the range of 28 to 33% by weight.

The above-mentioned process of frying raw wontons 180 to 600 seconds is considerably inefficient from the standpoint of rapid tonnage production. Therefore, such long frying time should be shortened for this purpose. It has occurred to the present inventor's mind that if a raw wonton is subject to first or preliminary-frying in oil heated to a relatively low level of temperature and then to second or final frying in oil heated to a higher level of temperature than applied in the first frying step, then the above-mentioned object would be attained.

EXPERIMENT 4

The frying of a raw wonton was divided into the steps; that is, a first step of frying the raw wonton in oil heated to a relatively low level of temperature and a second step of frying the preliminarily fried wonton in oil heated to a higher level of temperature than used in the first frying step. The raw wonton was first fried 60 seconds in oil heated to 110° C, and then passed through the atmosphere into oil baths heated to different levels of temperature to be subjected to the second or final frying for a sufficient length of time to decrease the water content of the skin of the preliminarily fried raw wonton to 4 to 8% by weight, the results being presented in Table 4 below.

Table 4

|  | Oil temperature (° C) | Frying time (second) | Water content of the skin after frying (% by weight) | Number of puffs per fried wonton | Condition of the skin surface of the fried wonton |
| --- | --- | --- | --- | --- | --- |
| First frying step | 110 | 60 | 18.5 | None | Smooth |
| Second frying step | 110 | 300 | 5.7 | " | " |
|  | 115 | 180 | 6.5 | " | " |
|  | 120 | 110 | 7.5 | " | " |
|  | 125 | 60 | 7.2 | " | " |
|  | 130 | 60 | 5.5 | " | " |
|  | 140 | 40 | 5.1 | 1 | Slightly roughened |
|  | 150 | 20 | 4.1 | 2 | Noticeably roughened |

Comparison between Tables 2 and 4 show that samples of raw wonton subjected to the second frying step in Experiment 4 only indicated a small number of puffs and a slightly roughened condition on the skin surface even when fried in oil heated to temperature ranging between 125° to 140° C. at which the samples of fried raw wonton used in Experiments 1 and 2 showed a roughened condition on the skin surface. Where fried in oil heated to, for example, 140° C in Experiment 2, the raw wonton showed eight puffs and a noticeably roughened condition on the skin surface. In contrast, where fried in oil heated similarly to 140° C in Experiment 4, the raw wonton only indicated one puff and a slightly roughened condition on the skin surface. The reason is assumed to be that the first frying step enabled water contained in the skin of the preliminarily fried raw wonton to be uniformly evaporated when the wonton was subjected to the second frying step carried out at a higher level of temperature than applied in the first frying step. Since frying oil can be heated to a considerably higher level of temperature in the second frying step than in the first frying step, the total frying time of the first and second frying steps can be more shortened than when the raw wonton is fried only once.

In the second frying step, oil should be heated to temperature ranging between 125° and 140° C. Where the oil temperature decreased from this range, for example, stood at 120° C, then the total frying time of the first and second frying steps was little different from that (Table 2) required to fry the raw wonton only once in oil heated to 120° C. Conversely, where the oil temperature exceeded 140° C, for example, indicated 150° C, then the fried raw wonton presented a prominently roughened condition on the skin surface, though only two puffs appeared on the skin surface. This roughened condition was assumed to arise from a short decline in the water content of the skin of the raw wonton fried in such highly heated oil, and prominently reduced the commercial value of the fried raw wonton.

With respect to Experiment 4, the present inventor further discovered that where the raw wonton subjected to the first or preliminarily frying step was further exposed to the atmosphere prior to the second frying step, then the time of said second frying step could be shortened. There will now be described a case in point. Where the raw wonton was fried continuously in a single step in oil heated to, for example, 125° C, the frying consumed 150 seconds (Table 2). In contrast, where the raw wonton initially fried 60 seconds in oil heated to 110° C and then subjected to the second frying step in oil heated to 125° C after exposed to the air, then the total frying time was 120 seconds (Table 4). The reason is supposed to be that when the raw wonton was exposed to the air after subjected to the first frying step, the temperature of the preliminarily fried wonton sharply dropped, and heat was released from the fried wonton in the form of evaporated water. Therefore, while two frying steps may be undertaken in the same fryer by frying the raw wonton initially in oil heated to a relatively low level of temperature and then in said oil now heated to a higher level of temperature than applied in the first frying step, it is rather advised to provide two separate fryers for the first and second frying steps and expose the raw wonton preliminarily fried in the first fryer to the air before subjecting said wonton to the second frying step in the second fryer.

If the first frying step is brought to an end in too short a time, then the raw wonton fried in the second step will present puffs and a roughened condition on the skin surface. Conversely where the first frying step consumes an unduly long time, then the total frying time of both first and second frying steps would be extended, and consequently the reason why the frying of the raw wonton should be carried out in two steps as claimed in this invention would cease to exist. Namely, the present inventor has ascertained that it is necessary to continue the first frying step 40 to 80 seconds in order to reduce the water content of the skin of the fried raw wonton to 16 to 20%, and also has noticed that the less than 15% water content of a filler can be reduced to a level of 4 to 8% by weight, while the water content of the skin of the raw wonton fried in two steps drops to the same level.

This invention will be more fully understood by reference to the following Example 1.

EXAMPLE 1

The undermentioned raw materials were blended in amounts indicated below by a known type of mixer to prepare wonton skins.

| Wheat flour | 37.5$^{kg}$ |
| --- | --- |
| Table salt | 0.4 |
| Kanpun | 0.04 |
| Water | 12.0 |
| Sorbitol | 1.3 |

A filler was prepared by blending in another known type of mixer 3.4 kg of freeze-dried minced pork containing less than 3% by weight of water and 1.1 kg of dehydrated minced onion and 0.8 kg of potato flour respectively containing 5 to 10% by weight of water.

A paste consisting of a mixture of the above-mentioned raw materials wonton skin was drawn flat by a known apparatus disclosed in the U.S. Pat. No. 3,858,497, and cut up into small skin pieces each weighing 3g. The whole mass of filler was divided into 0.4g chips which in turn were wrapped in the cutup skin pieces. The cutup wonton skin pieces had 31% by weight of water content on the average.

Raw wontons thus prepared were preliminarily fried 80 seconds in oil heated to 110° in a first fryer and finally fried 50 seconds in oil heated to 130° C in a second fryer. In this Example 1, palm oil was used. However, the frying oil may consist of cotton seed oil or any other vegetable oil or a mixture thereof with lard.

The samples of instant wonton thus prepared were forcefully cooled by cold air. As measured on the average, each sample contained 5% by weight of water and 33% by weight of oil and weighed 3.5g. The skin surface of the sample did not present puffs, cracks and roughened portions. When boiled 180 seconds in hot water at 90° to 95° C the sample was brought to a readily edible state without lossing flavor.

When marketed as instant food, every twelve wontons thus produced are sealed in a heat-resistant cup together with a granular raw material of soup. When hot water is poured directly into the cup, proper wontons can be served with soup for consumers in about 3 minutes.

Otherwise, every 14 instant wontons are packed in a covered container. In this case, an aluminium bag in which 9g of a powered raw material of soup is sealed is also packed in the container. Before being served, the instant wontons are boiled about two minutes in a suitable amount of hot water and thereafter the raw material of soup is added to the hot water.

What is claimed is:

1. A method of producing instant wontons containing a filler which comprises the steps of preparing raw wontons consisting of a filler wrapped in a skin of dough consisting mainly of wheat flour and containing 28 to 33% by weight of water; preliminarily frying the raw wontons in oil heated to a temperature ranging between 105° and 120° C for a predetermined period sufficient to reduce the water content of the skin of the raw wontons thus fried to 16 to 20% by weight; and finally frying the preliminarily fried wontons in oil heated to 125° to 140° C for a predetermined period sufficient to decrease the water content of the skin of the wontons thus fried to 4 to 8% by weight.

2. The method according to claim 1, wherein the raw wontons subject to the preliminarily frying step are further exposed to air for evaporation of water before the final frying step is carried out.

3. The method according to claim 2, wherein the preliminarily frying step is undertaken in oil heated to temperature ranging between 110° and 115° C.

4. The method according to claim 3, wherein the preliminarily frying step is continued 40 to 80 seconds, and the final frying step is continued 40 to 60 seconds.

5. The method according to claim 1, wherein the preliminarily frying step is undertaken in oil heated to temperature ranging between 110° and 115° C.

6. The method according to claim 1, wherein the preliminarily frying step is continued 40 to 80 seconds, and the final frying step is continued 40 to 60 seconds.

7. The method according to claim 1 wherein said skin comprises table salt, potassium carbonate, sodium carbonate and sorbitol as additives.

* * * * *